United States Patent
Stapleton

(10) Patent No.: US 12,192,328 B1
(45) Date of Patent: Jan. 7, 2025

(54) SYSTEMS AND METHODS FOR SECURE COMMUNICATION BASED ON RANDOM KEY DERIVATION

(71) Applicant: Wells Fargo Bank, N.A., San Francisco, CA (US)

(72) Inventor: Jeff J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 248 days.

(21) Appl. No.: 17/662,707

(22) Filed: May 10, 2022

(51) Int. Cl.
 *H04W 12/37* (2021.01)
 *H04L 9/08* (2006.01)
 *H04L 9/32* (2006.01)

(52) U.S. Cl.
 CPC .......... *H04L 9/0825* (2013.01); *H04L 9/0852* (2013.01); *H04L 9/0869* (2013.01); *H04L 9/3242* (2013.01)

(58) Field of Classification Search
 None
 See application file for complete search history.

(56) References Cited

U.S. PATENT DOCUMENTS

| | | | | |
|---|---|---|---|---|
| 2003/0147267 A1* | 8/2003 | Huttunen | ............... | H04L 9/0891 365/63 |
| 2005/0147250 A1* | 7/2005 | Tang | ....................... | G06Q 20/20 380/259 |
| 2010/0299526 A1 | 11/2010 | Wiseman et al. | | |
| 2011/0213979 A1 | 9/2011 | Wiseman et al. | | |
| 2013/0073850 A1* | 3/2013 | Zaverucha | ............ | H04L 9/0869 713/168 |
| 2013/0083926 A1 | 4/2013 | Hughes et al. | | |
| 2014/0237246 A1* | 8/2014 | Brown | .................. | H04L 9/0869 713/171 |
| 2015/0188701 A1 | 7/2015 | Nordholt et al. | | |

(Continued)

FOREIGN PATENT DOCUMENTS

WO   WO-2022211731 A1 * 10/2022 ........... H04L 9/0822

OTHER PUBLICATIONS

Thu A. Pham, et al., Quantum Key Distribution over Hybrid Fiber-Wireless System for Mobile Networks, SoICT 2019: Proceedings of the Tenth International Symposium on Information and Communication Technology, Dec. 2019, https://dl.acm.org/doi/10.1145/3368926.3369670.

(Continued)

*Primary Examiner* — William J. Goodchild
(74) *Attorney, Agent, or Firm* — K&L Gates LLP

(57) ABSTRACT

Systems, apparatuses, methods, and computer program products are disclosed for secure communication based on random key derivation. An example method includes receiving, by communications hardware of a first device, an initial key shared between the first device and a second device. The example method also includes receiving, by the communications hardware of the first device, a first set of seed bits, wherein the first set of seed bits is also received by the second device. The example method also includes deriving, by key derivation circuitry of the first device, a first symmetric key based on the initial key and the first set of seed bits. The example method also includes performing, by data protection circuitry of the first device, a first cryptographic data protection action using the first symmetric key.

23 Claims, 7 Drawing Sheets

(56) References Cited

U.S. PATENT DOCUMENTS

| | | |
|---|---|---|
| 2016/0248581 A1 | 8/2016 | Fu et al. |
| 2016/0285629 A1 | 9/2016 | Tanizawa |
| 2020/0274701 A1 | 8/2020 | Yuan et al. |
| 2020/0351806 A1 | 11/2020 | Walenta et al. |
| 2021/0036846 A1 | 2/2021 | Grice et al. |
| 2021/0119787 A1 | 4/2021 | Huberman et al. |
| 2021/0226782 A1 | 7/2021 | Florit et al. |

OTHER PUBLICATIONS

Miralem Mehic, et al., Quantum Key Distribution: A Networking Perspective, ACM Computing Surveys, vol. 53, Issue 5, Oct. 2020, Article No. 96, pp. 1-41, https://dl.acm.org/doi/10.1145/3402192.

* cited by examiner

SYSTEMS AND METHODS FOR SECURE COMMUNICATION BASED ON RANDOM KEY DERIVATION

BACKGROUND

Symmetric keys may be shared between multiple parties in order to securely communicate and protect data. To maintain security, symmetric keys may be assigned a lifecycle, and upon expiration of the lifecycle, a new symmetric key may be established for the parties. However, in many cases, establishment and distribution of a symmetric key is a burdensome and time-consuming process, and continuous establishment and distribution of new symmetric keys significantly increases operational overhead, costs, and security vulnerabilities, especially in cases in which symmetric keys are assigned short lifecycles.

BRIEF SUMMARY

Conventional key establishment methods, such as Quantum Key Distribution (QKD), the use of pre-shared keys (PSK), or the like, establish symmetric keys between parties (e.g., Alice and Bob) to protect data. Each time the symmetric key(s) reach the end of an assigned lifecycle, the key(s) must be reestablished, in that new symmetric key(s) must be generated and distributed to the parties. However, as mentioned above, due to the time-consuming and procedure-laden nature of these conventional methods, continuous establishment of new keys is not ideal, especially when short key lifecycles are involved. As one example, traditional key distribution processes may involve tasking a key management team with manually removing key components from a safe, designating key holders as well as security personnel to watch over the process, and physically mailing the components via separate mail channels.

Systems, apparatuses, methods, and computer program products are disclosed herein for secure communication based on random key derivation. Embodiments herein provide a more efficient and improved process for maintaining secure communication between devices in the event of key lifecycle expiration. Embodiments herein avoid both the elevated risk of key exposure and the onerous key distribution processes seen in traditional implementations, and provide a lightweight and efficient key derivation process using an initial key in conjunction with and one or more key derivation functions (KDFs) to continuously derive new keys for secure communication.

In one example embodiment, a method is provided for secure communication based on random key derivation. The method includes receiving, by communications hardware of a first device, an initial key shared between the first device and a second device. The method also includes receiving, by the communications hardware of the first device, a first set of seed bits, wherein the first set of seed bits is also received by the second device. The method also includes deriving, by key derivation circuitry of the first device, a first symmetric key based on the initial key and the first set of seed bits. The method also includes performing, by data protection circuitry of the first device, a first cryptographic data protection action using the first symmetric key, the first cryptographic data protection action facilitating secure communication between the first device and the second device based on the second device having also derived the first symmetric key.

In another example embodiment, an apparatus is provided for secure communication based on random key derivation. The apparatus includes communications hardware of a first device configured to receive an initial key shared between the first device and a second device, and receive a first set of seed bits, wherein the first set of seed bits is also received by the second device. The apparatus also includes key derivation circuitry of the first device configured to derive a first symmetric key based on the initial key and the first set of seed bits. The apparatus also includes data protection circuitry of the first device configured to perform a first cryptographic data protection action using the first symmetric key, the first cryptographic data protection action facilitating secure communication between the first device and the second device based on the second device having also derived the first symmetric key.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
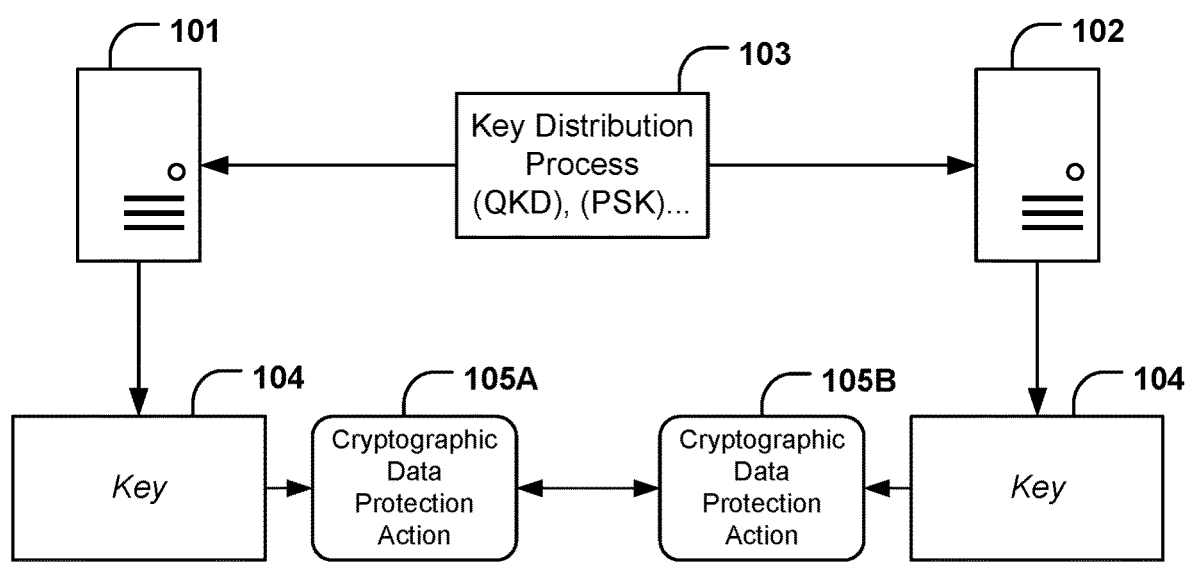
FIG. 1 illustrates a conventional method of establishing and maintaining secure communication between example devices.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for secure communication based on random key derivation. Traditionally, it has been very burdensome (both computationally and physically) to maintain secure communications between multiple parties (e.g., devices, systems, or the like). Some examples of traditional key distribution processes involve distributing pre-shared keys (PSK) or distributing keys derived using quantum mechanics, one example being Quantum Key Distribution (QKD).

In a traditional QKD implementation, a QKD device generates two streams of quantum entangled particles (e.g., photons) and sends one stream to a first device (Alice) and another to a second device (Bob). Typically, one of the participants manages the QKD device, but it could be managed by a third party. Alice and Bob both read the received entangled particles, interpreting the same string of binary zeroes and ones. Alice and Bob can use a separate communications channel to statically verify that they have read and interpreted the entangled particles correctly. A device reading any photon will affect the state of that photon, so through a variety of operations, Alice and Bob are able to determine whether an attacker (e.g., Eve) using a third device has eavesdropped on any of the transmitted photons. As a result, Alice and Bob are able to use only photons that were not eavesdropped on as the basis for generation of a key known only to each other. That key can then be used for secure communications.

Other methods of key distribution may also be used. For example, in many instances, secret keys are injected into devices within a Key Injection Facility (KIF), which is a physically secure room. After receipt of one or more secret keys within a KIF, a device can thereafter be shipped to remote locations where it can utilize the injected secret keys. To facilitate this process, such devices often include a Secure Cryptographic Device (SCD) that provides physically and logically protected cryptographic services and storage (e.g., a PIN entry device (PED) or Hardware Security Module (HSM)) into which the secret key(s) are injected. For instance, an SCD (e.g., an encryption personal identification number (PIN) pad (EPP)) may be integrated into a larger system such as an automated teller machine (ATM) or point-of-sale (POS) terminal, and after injection of one or more secret keys into the integrated SCD, the larger system may thereafter be deployed to its ultimate destination for use in commerce.

Another common method for distributing keys uses a SCD as a portable Key Loading Device (KLD), which is a mobile device that can physically transport and inject keys outside of a key injection facility (KIF). Keys are prepared and transferred from a secure cryptographic device (SCD) to the KLD within the KIF. The KLD is then physically transported to a remote device and the prepared keys are transferred to the SCD of the remote device. Thus, secure communication between the remote device and a host device may be established.

FIG. 1 illustrates an example of a conventional process of establishing secure communication between devices using a symmetric key. As shown, a first device 101 (e.g., Alice) and a second device 102 (e.g., Bob) each receive or otherwise obtain a key via a key distribution process 103. The key distribution process may comprise QKD, a distribution of PSKs, or other key distribution process. Regardless of the type of key distribution process, once the key is distributed, Alice and Bob then have a key 104 which can be used to perform cryptographic data protection actions (e.g., cryptographic data protection actions 105A and 105B). For instance, an example cryptographic data protection action 105A performed by the first device 101 may be encrypting data using the key 104 and an example cryptographic data protection action 105B performed by the second device 102 may be decrypting the data using the key 104 after receiving the data from the first device 101. After some predefined time has elapsed, and/or after the key 104 has been used to perform a predefined number of cryptographic data protection actions, the lifecycle of the key 104 may expire, and thus a new key is required to be established and distributed to the first device 101 and second device 102 in order for the devices to maintain secure communications and the ability to perform cryptographic data protection actions. Conventionally, the key distribution process 103 is repeated, and a new key is issued to the devices. However, as the examples above illustrate, key distribution processes are often complex and onerous. Thus, continuously establishing and distributing new keys when keys expire in order to maintain secure communications between multiple parties results in an exponentially burdensome experience that is extremely prone to human error. Keys assigned short lifecycles (e.g., 24 hours, 1 hour, 10 minutes, and/or less than 25 utilizations, for example) further compound this issue and make continuous execution of key distribution processes almost, if not completely, unfeasible.

Figure 2:
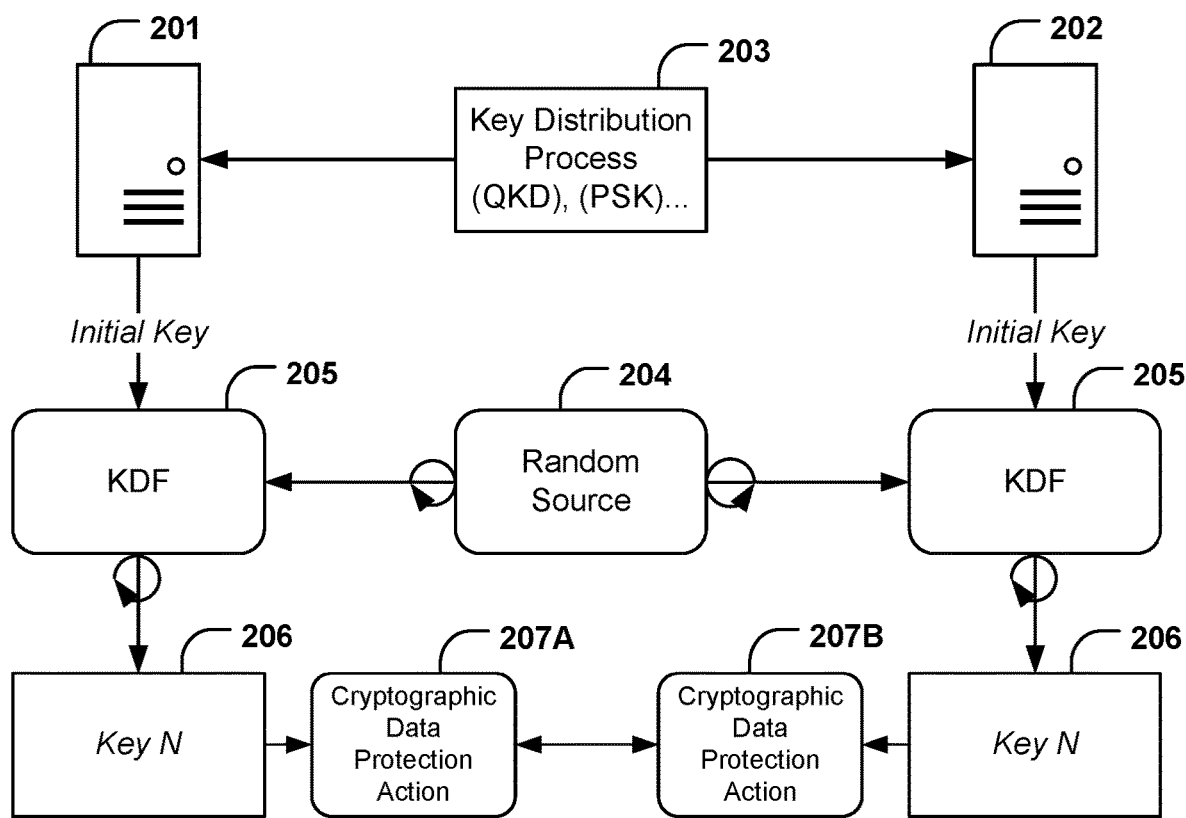
FIG. 2 illustrates an improved method of establishing and maintaining secure communication between example devices in accordance with some example embodiments described herein.

In contrast to these conventional techniques, example embodiments described herein provide secure communication based on random key derivation, as illustrated at a high level by FIG. 2. As shown, a first device 201 (e.g., Alice) and a second device 202 (e.g., Bob) each receive or otherwise obtain a key via a key distribution process 203. The key distribution process may comprise QKD, a distribution of PSKs, or other key distribution process. Regardless of the type of key distribution process, once an initial key is distributed and obtained, rather than using the initial key for secure communication (e.g., performing cryptographic data protection actions with the initial key), the initial key is effectively used as a key derivation key (KDK). In this regard, the first device 201 and the second device 202 each receive a set of seed bits (e.g., a random number or random stream of numbers) from a random source 204 and combine the set of seed bits with the initial key, using an agreed-upon key derivation function (KDF) 205, to generate a key N 206. The key N 206 may then be used to facilitate secure communication between the first device 201 and the second device 202 (e.g., perform cryptographic data protection actions, such as cryptographic data protection actions 207A and 207B). Advantageously, at the end of the lifecycle of initial key, rather than repeating the key distribution process 203 to generate a new key, the devices may receive a new set of seed bits from the random source 204 and combine the new set of seed bits with the initial key, using the KDF 205, to generate a new key, e.g., key N+1. The new key N+1 may then be used to facilitate secure communication between the first device 201 and the second device 202 and the key N 206 may be discarded. This process may be repeated numerous times, for hundreds, thousands, millions, or even billions of keys.

Accordingly, the present disclosure sets forth systems, methods, and apparatuses that provide secure communication based on random key derivation and improve upon conventional key distribution processes. There are many advantages of these and other embodiments described herein. For instance, embodiments herein decrease operational overhead, costs, and the likelihood of security issues and human error by avoiding continuous execution of key distribution processes (e.g., PSK, QKD, etc.). In addition, by only needing to receive sufficient seed bits (e.g., from the random source 204) to generate a new key, embodiments herein can operate within extremely low bandwidth environments or during intermittent connections. Finally, security of communications between devices is enhanced, in that while the generation of new keys is streamlined and more efficient, additional complexity is added by way of the KDF and the random source, making it more difficult for bad actors to gain knowledge of the key (e.g., a bad actor would be required not only to know the initial key, but also the exact type of KDF used as well as the precise set of seed bits).

Although a high level explanation of the operations of example embodiments has been provided above, specific details regarding the configuration of such example embodiments are provided below.

System Architecture

Figure 3:
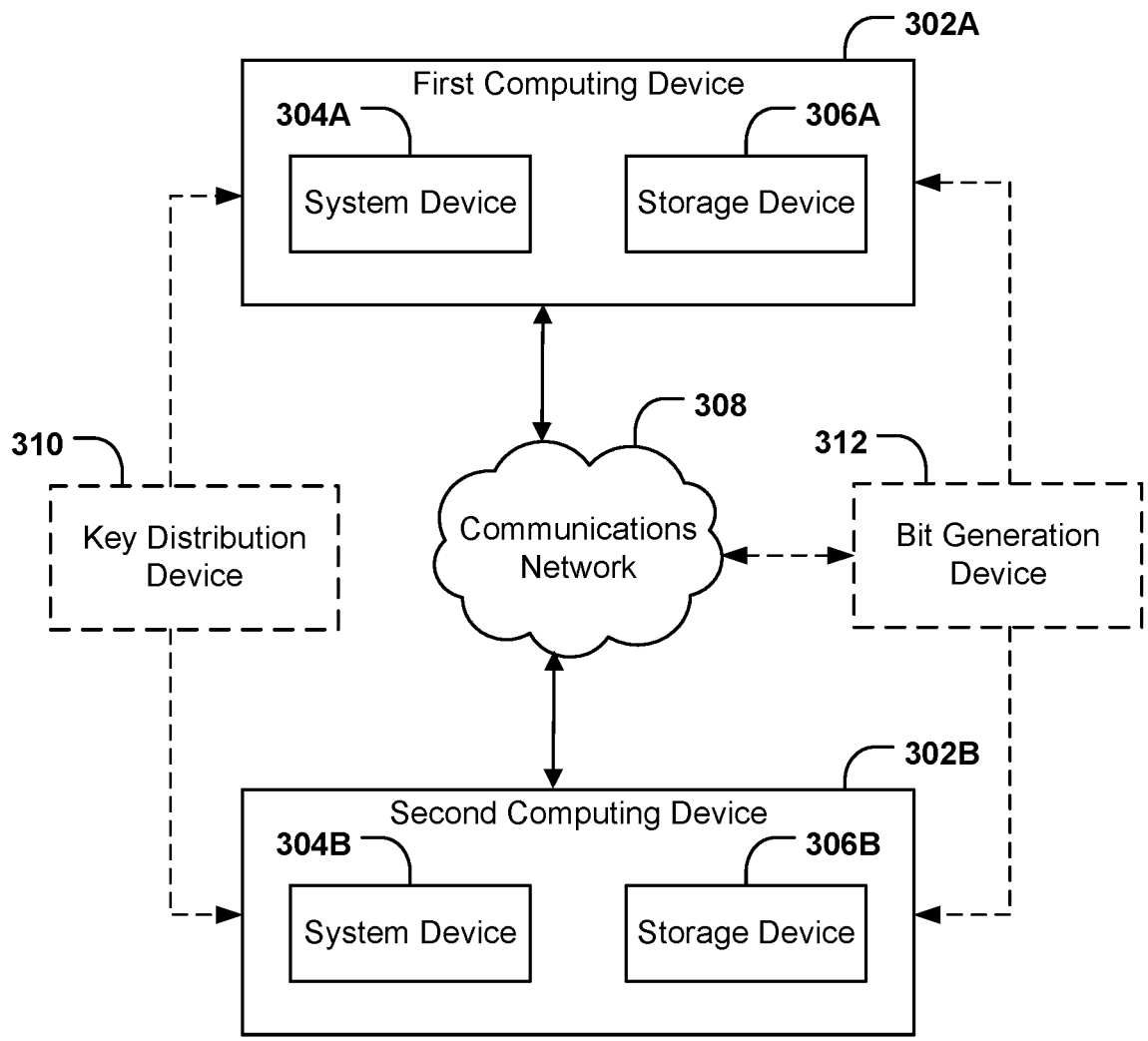
FIG. 3 illustrates a system in which some example embodiments may be used.

Example embodiments described herein may be implemented using any of a variety of computing devices or servers. To this end, FIG. 3 illustrates an example environment within which various embodiments may operate. As illustrated, the environment may include a first computing device 302A which may include a system device 304A in communication with a storage device 306A. The environment may also include other computing devices, such as a second computing device 302B, which may also include a system device 304B in communication with a storage device 306B. Although system devices 304A and 304B and storage devices 306A and 306B are described in singular form, computing devices in some embodiments may utilize more than one system device and/or more than one storage device. Additionally, in some embodiments, the computing devices 302A and 302B may not require a storage device at all. Whatever the implementation, the first and second computing devices 302A and 302B, and their constituent system device(s) 304A and 304B and/or storage device(s) 306A and 306B may receive and/or transmit information via communications network 308 (e.g., the Internet) with any number of other devices, such as one or more additional computing devices (not shown), a key distribution device 310, and/or a bit generation device 312.

System devices 304A and 304B may be implemented as one or more servers, which may or may not be physically proximate to other components of their respective computing devices (e.g., first computing device 302A and second computing device 302B). Furthermore, some components of system devices 304A and 304B may be physically proximate to the other components of their respective computing devices while other components are not. System devices 304A and 304B may receive, process, generate, and transmit data, signals, and electronic information to facilitate the operations of first computing device 302A and second computing device 302B. Particular components of system devices 304A and 304B are described in greater detail below with reference to apparatus 400 in connection with FIG. 4.

Storage devices 306A and 306B may comprise distinct components from system devices 304A and 304B, or may comprise an element of system devices 304A and 304B (e.g., memory 404, as described below in connection with FIG. 4). Storage devices 306A and 306B may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 308). Storage devices 306A and 306B may host the software executed to operate the first computing device 302A and second computing device 302B, respectively. Storage devices 306A and 306B may store information relied upon during operation of the first and second computing devices, such as various sets of seed bits, key derivation functions, and/or other information that may be used by the first and second computing devices, data and documents to be analyzed using the first and second computing devices, or the like. In addition, storage devices 306A and 306B may store control signals, device characteristics, and access credentials enabling interaction between the first computing device 302A and second computing device 302B and one or more of the bit generation device 312 and key distribution device 310.

The key distribution device 310 may be embodied by various storage devices known in the art. For instance, the key distribution device 310 may comprise a key loader device (KLD) used to load cryptographic keys into electronic devices. In some embodiments, the key distribution device 310 may comprise a mobile quantum key distribution (MQKD) device, as disclosed in U.S. patent application Ser. No. 17/451,800, the entirety of which is incorporated herein by reference. In some embodiments, the key distribution device 310 may include one or more connection ports or the like suitable to transmit entangled particles (e.g., in embodiments in which QKD serves as the initial key distribution process). For example, the key distribution device 310 may comprise a connection port for a fiber-optic cable and/or a laser port. More broadly, a key distribution device 310 may include connection ports of one kind or another that are suitable to inject data (e.g., quantum-entangled particles, symmetric keys, and/or the like) into devices (e.g., first computing device 302A and second computing device 302B) which may or may not be quantum-enabled (e.g., able to receive and process quantum entangled particles).

The bit generation device 312 may be embodied by various computing devices known in the art. The bit generation device 312 may be capable of generating a set of seed bits (e.g., a random or truly random number) and causing transmission of the set of seed bits to various computing devices (e.g., the first computing device 302A and the second computing device 302B). In some embodiments, the bit generation device 312 may cause transmission of the set of seed bits over the communications network 308 via a cryptographic protocol (e.g., via a Transport Layer Security (TLS) connection or the like). To generate a set of seed bits, the bit generation device 312 may comprise random number generator circuitry (further described below in connection with FIGS. 2 and 3), which may comprise a random number generator (RNG) or, in some embodiments, a quantum random number generator (QRNG).

The first computing device 302A and second computing device 302B may be embodied by any computing devices known in the art, such as desktop or laptop computers, tablet devices, smartphones, server devices (e.g., a secure data center or other device hosted within the secure network infrastructure of an organization or entity), Automated Teller Machines (ATMs), point-of-sale (POS) devices, or the like. Moreover, the first computing device 302A and second computing device 302B need not themselves be independent devices, but may be peripheral devices communicatively coupled to other computing devices.

Example Implementing Apparatuses

Figure 4:
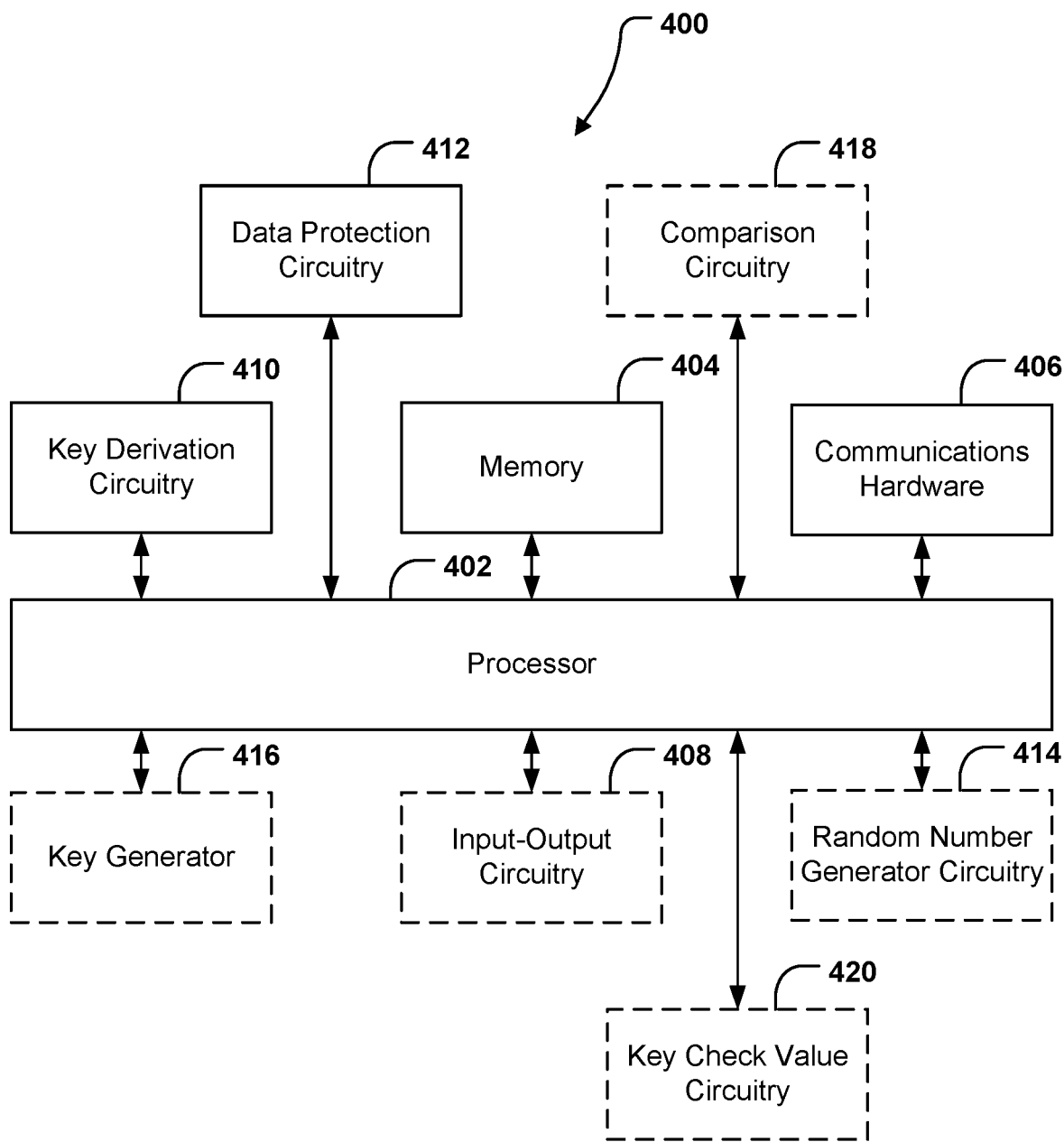
FIG. 4 illustrates a schematic block diagram of example circuitry embodying a device that may perform various operations in accordance with some example embodiments described herein.

System device 304A of the first computing device 302A and system device 304B of the second computing device 302B (described previously with reference to FIG. 3) may each be embodied by one or more computing devices or servers, shown as apparatus 400 in FIG. 4. As illustrated in FIG. 4, the apparatus 400 may include processor 402, memory 404, communications hardware 406, input-output circuitry 408, key derivation circuitry 410, data protection circuitry 412, and, in some embodiments, may optionally include random number generator circuitry 414, a key generator 416, comparison circuitry 418, and key check value circuitry 420, each of which will be described in greater detail below. While the various components are only illustrated in FIG. 4 as being connected with processor 402, it will be understood that the apparatus 400 may further comprises a bus (not expressly shown in FIG. 4) for passing information amongst any combination of the various components of the apparatus 400. The apparatus 400 may be configured to execute various operations described above in connection with FIG. 3 and below in connection with FIGS. 6 and 7.

The processor 402 (and/or co-processor or any other processor assisting or otherwise associated with the processor) may be in communication with the memory 404 via a bus for passing information amongst components of the apparatus. The processor 402 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 400, remote or "cloud" processors, or any combination thereof.

The processor 402 may be configured to execute software instructions stored in the memory 404 or otherwise accessible to the processor (e.g., software instructions stored on a separate storage device (e.g., storage device 306A and/or storage device 306B), as illustrated in FIG. 1). In some cases, the processor may be configured to execute hard-coded functionality. As such, whether configured by hardware or software methods, or by a combination of hardware with software, the processor 402 represent an entity (e.g., physically embodied in circuitry) capable of performing operations according to various embodiments of the present invention while configured accordingly. Alternatively, as another example, when the processor 402 is embodied as an executor of software instructions, the software instructions may specifically configure the processor 402 to perform the algorithms and/or operations described herein when the software instructions are executed.

Memory 404 is non-transitory and may include, for example, one or more volatile and/or non-volatile memories. In other words, for example, the memory 404 may be an electronic storage device (e.g., a computer readable storage medium). The memory 404 may be configured to store information, data, content, applications, software instructions, or the like, for enabling the apparatus to carry out various functions in accordance with example embodiments contemplated herein.

The communications hardware 406 may be any means such as a device or circuitry embodied in either hardware or a combination of hardware and software that is configured to receive and/or transmit data from/to a network and/or any other device, circuitry, or module in communication with the apparatus 400. In this regard, the communications hardware 406 may include, for example, a network interface for enabling communications with a wired or wireless communication network. For example, the communications hardware 406 may include one or more network interface cards, antennas, buses, switches, routers, modems, and supporting hardware and/or software, or any other device suitable for enabling communications via a network. Furthermore, the communications hardware 406 may include the processor for causing transmission of such signals to a network or for handling receipt of signals received from a network. In some embodiments, the communications hardware 406 may include, for example, interfaces such as one or more ports (e.g., a laser port, a fiber-optic cable port, and/or the like) for enabling communications with other devices.

The apparatus 400 may include input-output circuitry 408 configured to provide output to a user and, in some embodiments, to receive an indication of user input. It will be noted that some embodiments will not include input-output circuitry 408, in which case user input may be received via a separate device such as a separate client device or the like. The input-output circuitry 408 may comprise a user interface, such as a display, and may further comprise the components that govern use of the user interface, such as a web browser, mobile application, dedicated client device, or the like. In some embodiments, the input-output circuitry 408 may include a keyboard, a mouse, a touch screen, touch areas, soft keys, a microphone, a speaker, and/or other input/output mechanisms. The input-output circuitry 408 may utilize the processor 402 to control one or more functions of one or more of these user interface elements through software instructions (e.g., application software and/or system software, such as firmware) stored on a memory (e.g., memory 404) accessible to the processor 402.

In addition, the apparatus 400 further comprises key derivation circuitry 410 that derives symmetric keys (e.g., using an initial key and sets of seed bits). The key derivation circuitry 410 may utilize processor 402, memory 404, or any other hardware component included in the apparatus 400 to perform these operations, as described in connection with FIGS. 6 and 7 below. The key derivation circuitry 410 may further utilize communications hardware 406 to gather data from a variety of sources (e.g., bit generation device 312 and/or key distribution device 310, as shown in FIG. 3), may utilize input-output circuitry 408 to receive data from a user, and in some embodiments may utilize processor 402 and/or memory 404 to derive symmetric keys via one or more KDFs.

In addition, the apparatus 400 further comprises data protection circuitry 412 that performs cryptographic data protection actions using symmetric keys. The data protection circuitry 412 may utilize processor 402, memory 404, or any other hardware component included in the apparatus 400 to perform these operations, as described in connection with FIGS. 6 and 7 below. The data protection circuitry 412 may further utilize communications hardware 406 to gather data from a variety of sources (e.g., other computing devices such as the first computing device 302A or the second computing device 302B, as shown in FIG. 3), may utilize input-output circuitry 408 to receive data from a user, and in some embodiments may utilize processor 402 and/or memory 404 to encrypt data using a symmetric key, decrypt encrypted data using a symmetric key, generate a message authentication code using a symmetric key, and/or perform other cryptographic data protection actions.

In some embodiments, the apparatus 400 may optionally also comprise random number generator circuitry 414 that generates a set of seed bits. The random number generator circuitry 414 may utilize processor 402, memory 404, or any other hardware component included in the apparatus 400 to perform these operations, as described in connection with FIGS. 6 and 7 below. The random number generator circuitry 414 may further utilize communications hardware 406 to gather data from a variety of sources (e.g., computing devices such as the first computing device 302A or the second computing device 302B, as shown in FIG. 3), may utilize input-output circuitry 408 to receive data from a user, and in some embodiments may utilize processor 402 and/or memory 404 to generate a set of seed bits.

In some embodiments, the apparatus 400 may optionally also comprise a key generator 416 that generates a symmetric key. The key generator 416 may utilize processor 402, memory 404, or any other hardware component included in the apparatus 400 to perform these operations, as described in connection with FIG. 6 below. The key generator 416 may further utilize communications hardware 406 to gather data from a variety of sources (e.g., storage device 306A or 306B, as shown in FIG. 3), may utilize input-output circuitry 408 to receive data from a user, and in some embodiments may utilize processor 402 and/or memory 404 to measure entangled particles (e.g., received from a key distribution device 310) and generate a symmetric key based on the measurement of the entangled particles. The key generator 416 may be any means such as one or more devices or circuitry embodied in either hardware or a combination of hardware and software that is configured to measure entangled particles and generate symmetric keys. The entangled particles may be measured to obtain a symmetric key (e.g., in the form of a sequence of true random numbers).

Additionally, in some embodiments, the apparatus 400 may optionally comprise comparison circuitry 418 that hashes data (e.g., sets of seed bits) and compares data (e.g., portions of sets of seed bits and/or hashes of at least portions of sets of seed bits) and determines whether the data matches. The comparison circuitry 418 may utilize processor 402, memory 404, or any other hardware component included in the apparatus 400 to perform these operations, as described in connection with FIGS. 6 and 7 below. The comparison circuitry 418 may further utilize communications hardware 406 to gather data from a variety of sources (e.g., computing devices such as the first computing device 302A or the second computing device 302B, as shown in FIG. 3), may utilize input-output circuitry 408 to receive data from a user, and in some embodiments may utilize processor 402 and/or memory 404 to determine whether a first set of seed bits matches a second set of seed bits.

In addition, in some embodiments, the apparatus 400 may optionally further comprise key check value circuitry 420 that compares key check values and determines whether the key check values match. In some embodiments, the key check value circuitry 420 may be configured to generate key check values. The key check value circuitry 420 may utilize processor 402, memory 404, or any other hardware component included in the apparatus 400 to perform these operations, as described in connection with FIGS. 6 and 7 below. The key check value circuitry 420 may further utilize communications hardware 406 to gather data from a variety of sources (e.g., computing devices such as the first computing device 302A or the second computing device 302B, as shown in FIG. 3), may utilize input-output circuitry 408 to receive data from a user, and in some embodiments may utilize processor 402 and/or memory 404 to determine whether a first key check value matches a second key check value.

Although components 402-420 are described in part using functional language, it will be understood that the particular implementations necessarily include the use of particular hardware. It should also be understood that certain of these components 402-420 may include similar or common hardware. For example, the key derivation circuitry 410, data protection circuitry 412, random number generator circuitry 414, and key generator 416, comparison circuitry 418, and key check value circuitry 420 may each at times leverage use of the processor 402, memory 404, communications hardware 406, or input-output circuitry 408, such that duplicate hardware is not required to facilitate operation of these physical elements of the apparatus 400 (although dedicated hardware elements may be used for any of these components in some embodiments, such as those in which enhanced parallelism may be desired). Use of the terms "circuitry," and "generator" with respect to elements of the apparatus therefore shall be interpreted as necessarily including the particular hardware configured to perform the functions associated with the particular element being described. Of course, while the terms "circuitry" and "generator" should be understood broadly to include hardware, in some embodiments, the terms "circuitry" and "generator" may in addition refer to software instructions that configure the hardware components of the apparatus 400 to perform the various functions described herein.

Although the key derivation circuitry 410, data protection circuitry 412, random number generator circuitry 414, key generator 416, comparison circuitry 418, and key check value circuitry 420 may leverage processor 402, memory 404, communications hardware 406, or input-output circuitry 408 as described above, it will be understood that any of these elements of apparatus 400 may include one or more dedicated processor, specially configured field programmable gate array (FPGA), or application specific interface circuit (ASIC) to perform its corresponding functions, and may accordingly leverage processor 402 executing software stored in a memory (e.g., memory 404), or memory 404, communications hardware 406 or input-output circuitry 408 for enabling any functions not performed by special-purpose hardware elements. In all embodiments, however, it will be understood that the key derivation circuitry 410, data protection circuitry 412, random number generator circuitry 414, key generator 416, comparison circuitry 418, and key check value circuitry 420 are implemented via particular machinery designed for performing the functions described herein in connection with such elements of apparatus 400.

Figure 5:
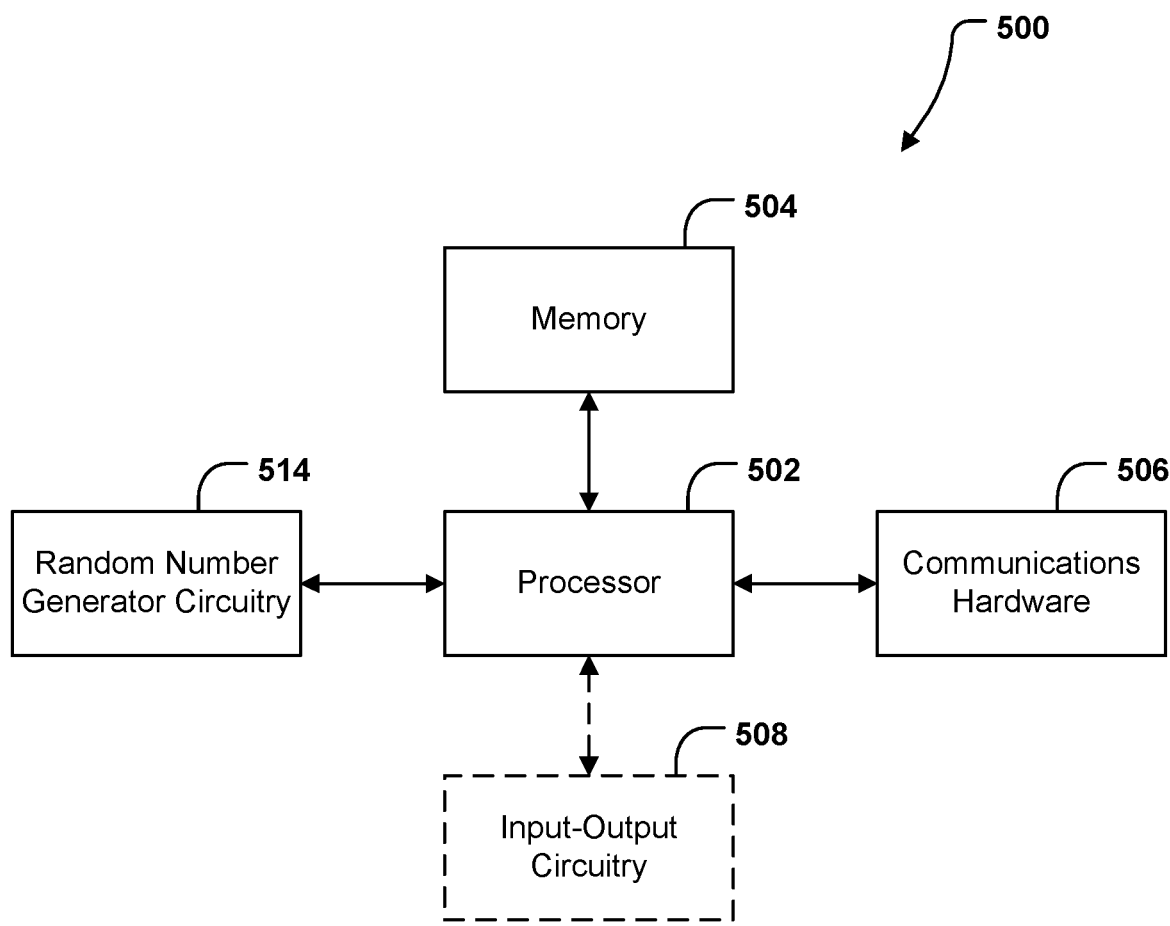
FIG. 5 illustrates a schematic block diagram of example circuitry embodying a bit generation device that may perform various operations in accordance with some example embodiments described herein.

As illustrated in FIG. 5, an apparatus 500 is shown that represents an example bit generation device 312. The apparatus 500 includes processor 502, memory 504, communications hardware 506, and random number generator circuitry 514, and may optionally include input-output circuitry 508, each of which is configured to be similar to the similarly named components described above in connection with FIG. 4.

In some embodiments, various components of the apparatuses 400 and 500 may be hosted remotely (e.g., by one or more cloud servers) and thus need not physically reside on the corresponding apparatus 400 or 500. Thus, some or all of the functionality described herein may be provided by third party circuitry. For example, a given apparatus 400 or 500 may access one or more third party circuitries via any sort of networked connection that facilitates transmission of data and electronic information between the apparatus 400 or 500 and the third party circuitries. In turn, that apparatus 400 or 500 may be in remote communication with one or more of the other components describe above as comprising the apparatus 400 or 500.

As will be appreciated based on this disclosure, example embodiments contemplated herein may be implemented by apparatus 400. Furthermore, some example embodiments may take the form of a computer program product comprising software instructions stored on at least one non-transitory computer-readable storage medium (e.g., memory 404). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 400 as described in FIG. 4 or apparatus 500 as described in FIG. 5, that loading the software instructions onto a computing device or apparatus produces a special-purpose machine comprising the means for implementing various functions described herein.

Having described specific components of example apparatuses 400 and 500, example embodiments are described below in connection with a series of flowcharts.

Example Operations

Figure 6:
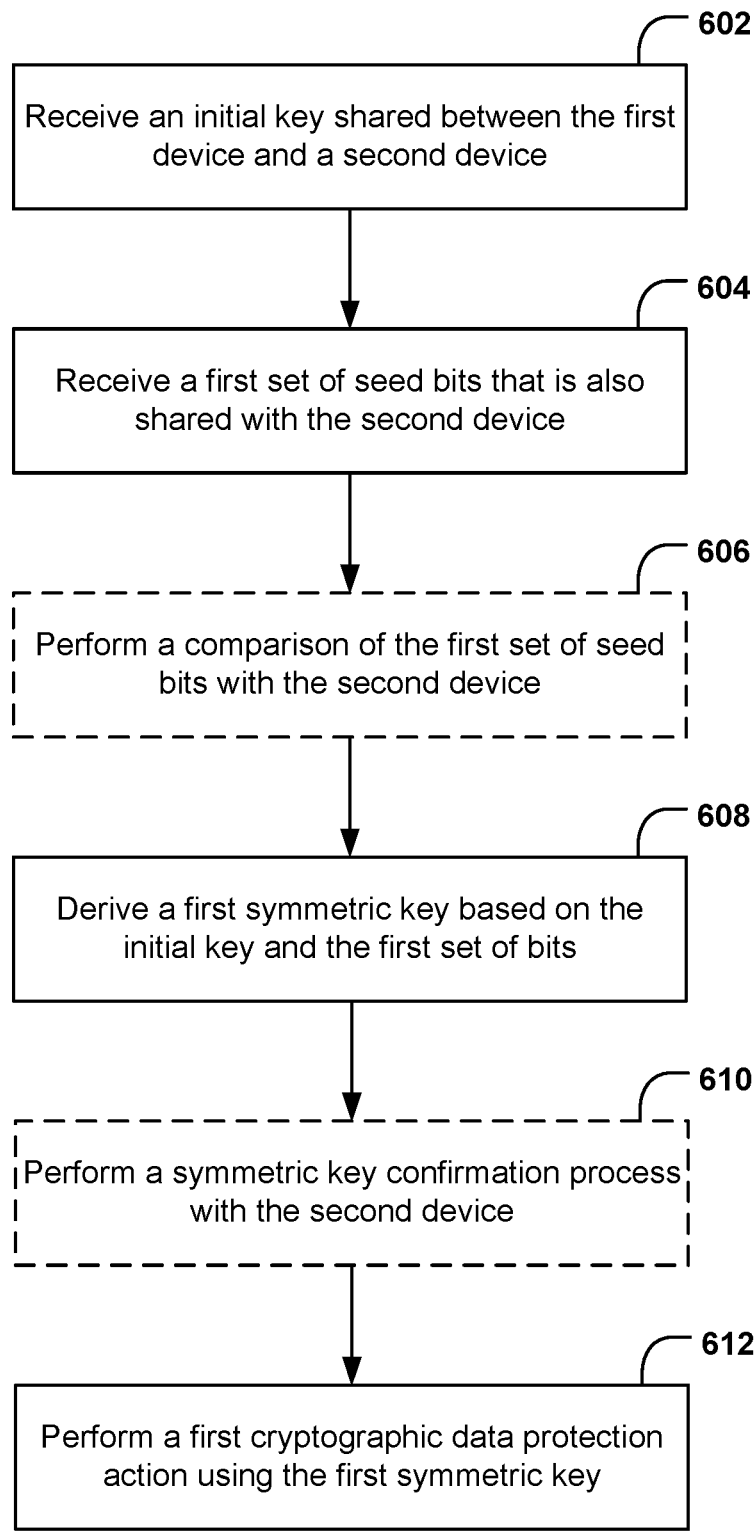
FIG. 6 illustrates an example flowchart for secure communication based on random key derivation, in accordance with some example embodiments described herein.
Figure 7:
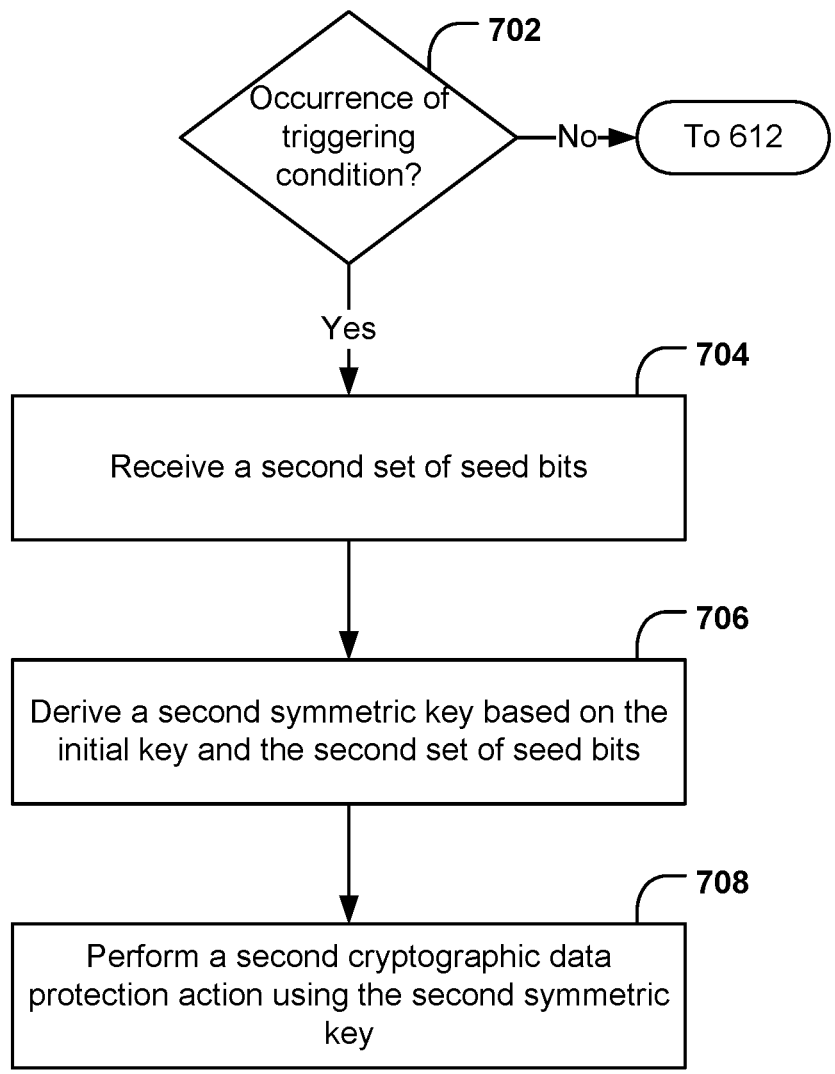
FIG. 7 illustrates an example flowchart for secure communication based on random key derivation, in accordance with some example embodiments described herein.

Turning to FIGS. 6 and 7, example flowcharts are illustrated that contain example operations implemented by example embodiments described herein. The operations illustrated in FIGS. 6 and 7 may, for example, be performed by system device 304A of the first computing device 302A shown in FIG. 3, which may in turn be embodied by an apparatus 400, which is shown and described in connection with FIG. 4. To perform the operations described below, the apparatus 400 may utilize one or more of processor 402, memory 404, communications hardware 406, input-output circuitry 408, key derivation circuitry 410, data protection circuitry 412, random number generator circuitry 414, key generator 416, comparison circuitry 418, key check value circuitry 420, and/or any combination thereof. It will be understood that user interaction with the first computing device 302A may occur directly via input-output circuitry 408, or may instead be facilitated by a separate client device or the like, and which may have similar or equivalent physical componentry facilitating such user interaction.

Turning first to FIG. 6, example operations are shown for secure communication based on random key derivation.

As shown by operation 602, the apparatus 400 includes means, such as processor 402, memory 404, communications hardware 406, or the like, for receiving an initial key. The initial key may be shared between a first device (e.g., first computing device 302A) and a second device (e.g., second computing device 302B) in that the initial key is received at both the first computing device 302A and the second computing device 302B.

The initial key may be received in a variety of ways. In some embodiments, the initial key may be distributed to the first and second computing devices via a key distribution process, as described above in connection with FIG. 2. For example, an initial key may be distributed to the first computing device 302A and the second computing device 302B via a key distribution device 310. In some embodiments, in instances in which the first computing device 302A is a stationary device (e.g., an ATM, POS terminal, or the like), the first computing device 302A may receive the initial key from a key distribution device at an installed location of the first computing device (e.g., a branch or other establishment at which the stationary device is installed).

In some embodiments, at least a pair of entangled particles may be generated and measured to establish an initial key, which may then be distributed to the first computing device 302A and second computing device 302B via the key distribution device 310. In some embodiments, the initial key may be received via a direct connection between the key distribution device 310 and the first computing device 302A. Similarly, the second computing device 302B may also receive the initial key via a separate direct connection to the key distribution device 310.

In some embodiments, the first computing device 302A and/or second computing device 302B may be quantum-enabled (e.g., able to receive and process quantum entangled particles). In such embodiments, rather than receiving the initial key, the devices may instead each receive at least a particle of at least a pair of entangled particles (e.g., via a direct connection (e.g., a fiber optic or laser connection) with a key distribution device such as an MQKD device). The first and second computing devices may each then measure their respective particle(s) to each generate the initial key. In this regard, the apparatus 400 may include means, such as processor 402, memory 404, communications hardware 406, or the like, for receiving a first particle of a pair of entangled particles. The apparatus 400 may also include means, such as processor 402, memory 404, key generator 416, or the like, for generating the initial key based on the first particle of a pair of entangled particles.

In some embodiments, the initial key may not be generated or transmitted based on any quantum generation or distribution process, and instead may be a classical pre-shared key (PSK) or the like, transmitted using classical methods. In such embodiments, the initial key may be received at both the first computing device 302A and the second computing device 302B over a secure medium, such as via a TLS (or similar) connection or via a connection with key distribution device 310.

In some embodiments, the initial key may be pre-loaded (e.g., via a KIF and KLD as described above) on each of the first and second computing devices, and thus receiving the initial key may comprise accessing and retrieving the initial key from a memory of the device. In this regard, the apparatus 400 includes means, such as processor 402, memory 404, key derivation circuitry 410, or the like, for accessing the initial key from a memory (e.g., from memory 404, storage device 306A, storage device 306B, or the like).

As shown by operation 604, the apparatus 400 includes means, such as processor 402, memory 404, communications hardware 406, or the like, for receiving a first set of seed bits. In some embodiments, the first set of seed bits may comprise a random number (e.g., a random string of bits (e.g., a string of binary zeroes and ones)). The random number may be generated using a random number generator (e.g., random number generator circuitry 414). In some embodiments, the random number generator may be a QRNG, in which case the random number would be a truly random number.

In some embodiments, the first set of seed bits may be received by each of the first computing device 302A and the second computing device 302B. In this regard, the first set of seed bits may be generated by and received from a bit generation device 312 (e.g., via random number generator circuitry 514, as discussed above in connection with FIG. 5).

In some embodiments, the first set of seed bits may be transmitted to each of the first and second computing devices in response to a request from at least one of the devices. For instance, upon receiving the initial key, at least one of the first computing device 302A and second computing device 302B may cause transmission of a request for the first set of seed bits to the bit generation device 312. In this regard, the apparatus 400 includes means, such as processor 402, memory 404, communications hardware 406, or the like, for causing transmission of a request for a set of seed bits. The request may include an indication of the device(s) (e.g., a device identifier, IP address, or the like) to which the first set of seed bits should be sent. For example, the first computing device 302A may send a request to the bit generation device 312 requesting a first set of seed bits be transmitted to the first computing device 302A and the second computing device 302B.

In some embodiments, rather than receiving the first set of seed bits from a bit generation device 312, one of the computing devices may generate the first set of seed bits and cause transmission of the first set of seed bits to the other computing device. For example, upon receiving the initial key, the first computing device 302A may generate the first set of seed bits. In this regard, the apparatus 400 may include means, such as such as processor 402, memory 404, random number generator circuitry 414, or the like, for generating the first set of seed bits. The first computing device 302A may then share the first set of seed bits with the second computing device 302B, such that both computing devices obtain the first set of seed bits. In this regard, the apparatus 400 includes means, such as such as processor 402, memory 404, communications hardware 406, or the like, for causing transmission of the first set of seed bits.

Once the first computing device 302A and the second computing device 302B each receive the first set of seed bits, an optional confirmation step may be performed to ensure that both of the computing devices have obtained the same set of seed bits (e.g., the same random number). In this regard, as shown by operation 606, the apparatus 400 may include means, such as processor 402, memory 404, comparison circuitry 418, or the like, for performing a comparison of the first set of seed bits. As one example, in some embodiments, the second computing device 302B may cause transmission of a portion (e.g., a subset) of the first set of seed bits received at the second computing device 302B to the first computing device 302A. The first computing device 302A may then compare the received portion to the portion of the first set of seed bits received at the first computing device 302A to confirm whether the portions match. To do this, the apparatus 400 may include means, such as processor 402, memory 404, comparison circuitry 418, or the like, for comparing at least a portion of a set of seed bits with at least a portion of another set of seed bits.

In an instance in which the portions match, it may be assumed that the rest of the set of seed bits match as well. In some embodiments, the first computing device 302A may then send a confirmation message or the like to the second computing device 302B confirming that the portions match. In this regard, the apparatus 400 includes means, such as such as processor 402, memory 404, communications hardware 406, or the like, for causing transmission of a confirmation message. In an instance in which the portions do not match, the confirmation message may indicate that the portions do not match. In this case, at least one of the computing devices may then request a new set of seed bits from the bit generation device 312 (or alternatively, generate a new set of seed bits and cause transmission of the new set of seed bits to the other computing device).

It is to be appreciated that other means of comparing the sets of seed bits received by each of the computing devices may be employed, such as a comparison of key check values (KCV) as further detailed below. For example, in some embodiments, this may involve hashes of the received sets of seed bits (or portions thereof) may be generated and the hashes may be compared. In this regard, the apparatus 400 may include means, such as processor 402, memory 404, comparison circuitry 418, or the like, for hashing at least a portion of a set of seed bits. For example, the hashing may be performed using any hashing algorithm or the like known in the art. The apparatus 400 may also include means, such as processor 402, memory 404, comparison circuitry 418, or the like, for comparing a first hash and a second hash. For example, the first hash may comprise a hash of the first set of seed bits received by the first computing device 302A, and the second hash may comprise a hash of the first set of seed bits received by the second computing device 302B. In an instance in which the hashes match, a confirmation message confirming that the hashes match may be transmitted. For example, the first computing device 302A may then send a confirmation message or the like to the second computing device 302B confirming that the hashes match. In an instance in which the hashes do not match, the confirmation message may indicate that the hashes do not match. In this case, at least one of the computing devices may then request a new set of seed bits from the bit generation device 312 (or alternatively, generate a new set of seed bits and cause transmission of the new set of seed bits to the other computing device).

As shown by operation 608, the apparatus 400 includes means, such as processor 402, memory 404, key derivation circuitry 410, for deriving a first symmetric key based on the initial key and the first set of seed bits.

The first symmetric key may be derived using a key derivation function (KDF) that uses the initial key and the first set of seed bits as inputs to the KDF. Each of the first computing device 302A and the second computing device 302B may use the same KDF (e.g., a first KDF) to derive the symmetric key using the initial key and the first set of seed bits. In this regard, the particular KDF used by each of the computing devices may be predetermined in a prior agreement between the devices.

By deriving a symmetric key from the initial key and the first set of seed bits, security is improved over prior implementations because the initial key is never exposed (e.g., it is never used itself for secure communications). Instead, the initial key serves as a key derivation key (KDK) from which multiple symmetric keys may be generated.

Following the derivation of the first symmetric key by each of the first and second computing devices, an optional confirmation step may be performed to ensure that both of the computing devices have derived the same symmetric key. As shown by operation 610, the apparatus 400 may include means, such as processor 402, memory 404, comparison circuitry 418, for performing a symmetric key confirmation process.

In some embodiments, the symmetric key confirmation process may comprise causing transmission of a test message from the first computing device 302A to the second computing device 302B. The test message may comprise data that is encrypted by the first computing device 302A using the first symmetric key. The data may be simple text (e.g., "the quick brown fox jumps over the lazy dog") or some other noncritical data which can be used to ensure that the first symmetric key has been derived correctly at both the first computing device 302A and the second computing device 302B. For instance, the second computing device 302B may receive the test message, decrypt the encrypted data, and compare the decrypted data to predefined data (e.g., the noncritical data which may be known to the second computing device 302B) to confirm that the decrypted data matches the predefined data. If there is a match, it can be assumed that the first and second computing devices have each derived the same symmetric key. In an instance in which the decrypted data matches the unencrypted data, a confirmation message confirming the match may be transmitted. For example, the second computing device 302B may then send a confirmation message or the like to the first computing device 302A confirming the match. In an instance in which the data does not match, the confirmation message may indicate that the data does not match. In this case, at least one of the computing devices may then request a new set of seed bits from the bit generation device 312 (or alternatively, generate a new set of seed bits and cause transmission of the new set of seed bits to the other computing device) to then establish another symmetric key.

In some embodiments, the symmetric key confirmation process may comprise generating, and then causing transmission of, a KCV. In this regard, the first and second computing devices may utilize KCVs in order to verify accuracy of data transmitted between the devices. A KCV is a non-secret value that is cryptographically derived from a key (e.g., the first symmetric key) and is used to verify that the underlying value is as expected. For example, once the first symmetric key is derived at the first computing device 302A as described above, the first computing device 302A may generate a KCV that is based on the first symmetric key and provide the KCV to the second computing device 302B. In this regard, the apparatus 400 may include means, such as processor 402, memory 404, key check value circuitry 420, or the like, for generating a key check value based on the first symmetric key. The apparatus 400 may also include means, such as processor 402, memory 404, communications hardware 406, or the like, for causing transmission of the key check value. The second computing device 302B may also generate a KCV based on the first symmetric key derived at the second computing device. The second computing device 302B may then compare the KCV generated by the first computing device 302A with the KCV generated by the second computing device 302B to ensure that the KCVs match. In this regard, the apparatus 400 may also include means, such as processor 402, memory 404, key check value circuitry 420, or the like, for comparing a first key check value with a second key check value. If the KCVs match, it can be assumed that the first and second computing devices have each derived the same symmetric key. In an instance in which the KCVs match, a confirmation message confirming the match may be transmitted. For example, the second computing device 302B may cause transmission of a confirmation message or the like to the first computing device 302A confirming the match. In an instance in which the KCVs do not match, the confirmation message may indicate that the KCVs do not match. In this case, at least one of the computing devices may then request a new set of seed bits from the bit generation device 312 (or alternatively, generate a new set of seed bits and cause transmission of the new set of seed bits to the other computing device) to then establish another symmetric key, repeating operations 604-610 until it may be established that both devices possess the same symmetric key.

Once the first symmetric key has been derived at both the first computing device 302A and the second computing device 302B (and optionally, after a symmetric key confirmation process has successfully been performed as described above with respect to operation 610), the first and second computing devices may then begin communicating with each other using the symmetric key. In this regard, as shown by operation 612, the apparatus 400 includes means, such as processor 402, memory 404, data protection circuitry 412, or the like, for performing a first cryptographic data protection action using the first symmetric key. For instance, the first and second computing devices may begin securely communicating using the first symmetric key.

In some embodiments, performing a cryptographic data protection action may comprise encrypting data. In this regard, the apparatus 400 includes means, such as processor 402, memory 404, data protection circuitry 412, or the like, for encrypting data using the first symmetric key. In some embodiments, performing a cryptographic data protection action may comprise decrypting data. In this regard, the apparatus 400 includes means, such as processor 402, memory 404, data protection circuitry 412, or the like, for decrypting encrypted data using the first symmetric key. For example, the first computing device 302A may encrypt data using the first symmetric key and cause transmission of the encrypted data to the second computing device 302B. The second computing device 302B may then decrypt the encrypted data using the first symmetric key.

In some embodiments, performing a cryptographic data protection action may comprise generating a cryptographic key using the first symmetric key. For example, a cryptographic key (or multiple keys) may be derived in order to protect data stored at or communicated by the first computing device 302A. In this regard, the apparatus 400 includes means, such as processor 402, memory 404, data protection circuitry 412, key derivation circuitry 410 or the like, for generating a cryptographic key based at least on the first symmetric key. In some embodiments, performing a cryptographic data protection action may comprise generating a message authentication code, such as a hash-based message authentication code (HMAC). In this regard, the apparatus 400 includes means, such as processor 402, memory 404, data protection circuitry 412, or the like, for generating a message authentication code using the first symmetric key. A MAC may comprise data used for authenticating a message (e.g., to confirm that the message originated from the sender indicated by the message and has not been changed. A MAC protects a message's data integrity and authenticity by allowing verifiers to detect any changes to the content of the message. In addition to encryption, decryption, MAC generation, and cryptographic key generation, it is to be appreciated that other cryptographic data protection actions known in the art may also be performed using the first symmetric key.

In some embodiments, the first symmetric key may be assigned a lifecycle. This lifecycle may be based on a predefined amount of time and/or a predefined amount of uses of the first symmetric key. This lifecycle may be based on a prior agreement between the communicating devices (e.g., first computing device 302A and second computing device 302B). In some embodiments, the lifecycle of the first symmetric key may be based on an assigned lifecycle of the initial key. For instance, a lifecycle of the initial key may be 48 hours, such that after a period of 48 hours, use of the symmetric key must be discontinued and a new symmetric key must be established to continue secure communications between the devices. As another example, a lifecycle of a symmetric key may comprise a predefined number of uses of the key (e.g., a predefined amount of cryptographic data protection actions having been performed using the first symmetric key, a predefined number of transmissions of data encrypted with the first symmetric key between the computing devices, and/or the like). Turning next to FIG. 7, example operations are shown for maintaining secure communication by performing a symmetric key update process in the event of key lifecycle expiration.

As shown by decision point 702, the apparatus 400 includes means, such as processor 402, memory 404, communications hardware 406, data protection circuitry 412, or the like, for determining whether a triggering condition has occurred. In some embodiments, a triggering condition may comprise a predefined amount of cryptographic data protection actions having been performed using the first symmetric key (e.g., as defined by the lifecycle of the key). Additionally, or alternatively, in some embodiments, a triggering condition may comprise a predefined amount of time having elapsed since the deriving of the first symmetric key (e.g., as defined by the lifecycle of the key). In some embodiments, a triggering condition may comprise an update, replacement, or failure of the first computing device 302A and/or the second computing device 302B. For example, an event such as a software and/or firmware update to one or both of the computing devices, a replacement of software and/or hardware, peripheral device(s), and/or the like, a system error and/or reboot of the one or more computing devices may trigger a symmetric key update process.

If a triggering condition has not yet occurred, the method may return to operation 612, wherein the first computing device 302A and the second computing device 302B may continue to perform cryptographic data protection actions using the first symmetric key. However, in an instance in which it is determined that the triggering condition has occurred (e.g., the lifecycle of the first symmetric key has expired), the method may continue to operation 704.

As shown by operation 704, the apparatus 400 includes means, such as processor 402, memory 404, communications hardware 406, or the like, for receiving a second set of seed bits. In some embodiments, the second set of seed bits may be received by each of the first computing device 302A and the second computing device 302B in a similar fashion to how receiving the first set of seed bits (as described above in connection with operation 604). For example, in some embodiments, the second set of seed bits may be generated by and received from the bit generation device 312 in response to occurrence of a triggering condition.

Alternatively, in some embodiments, one of the computing devices may generate the second set of seed bits and cause transmission of the second set of seed bits to the other computing device. For example, determining that the triggering condition has occurred, the first computing device 302A may generate the second set of seed bits and cause transmission of the second set of seed bits to the second computing device 302B.

In some embodiments, the second set of seed bits may be transmitted to each of the first and second computing devices (e.g., from the bit generation device 312) in response to a request from at least one of the devices. For instance, upon determining that the triggering condition has occurred, at least one of the first computing device 302A and second computing device 302B may cause transmission of a request for the second set of seed bits to the bit generation device. As described above, the request may include an indication of device(s) (e.g., a device identifier, IP address, or the like) which to send the second set of seed bits to. For example, the first computing device 302A may send a request to the bit generation device 312 requesting a second set of seed bits be transmitted to the first computing device 302A and the second computing device 302B.

In some embodiments, the second set of seed bits may comprise a random number different from the first set of seed bits. Similar to the first set of seed bits, the second set of seed bits may be generated using a random number generator (e.g., random number generator circuitry 414 or 514). As described above, the random number generator may be a QRNG.

Once the first computing device 302A and the second computing device 302B each receive the second set of seed bits, an optional confirmation step (e.g., similar to operation 606) may be performed to ensure that both of the computing devices have obtained the same set of seed bits (e.g., the same random number). For example, as described above, a comparison the second set of seed bits may be performed. The comparison may involve a comparison of a portion (e.g., a subset) of the second set of seed bits received at the second computing device 302B and a portion of the second set of seed bits received at the first computing device 302A. In an instance in which the portions match, it may be assumed that the rest of the set of seed bits match as well. In some embodiments, the first computing device 302A may then send a confirmation message or the like to the second computing device 302B confirming that the portions match. In an instance in which the portions do not match, the confirmation message may indicate that the portions do not match. In this case, at least one of the computing devices may then request a new set of seed bits from the bit generation device 312 (or alternatively, generate a new set of seed bits and cause transmission of the new set of seed bits to the other computing device). As described above, other methods of comparison may be employed, such as a comparison of a hash of the second set of seed bits received at the second computing device 302B and a hash of the second set of seed bits received at the first computing device 302A.

As shown by operation 706, the apparatus 400 includes means, such as processor 402, memory 404, key derivation circuitry 410, for deriving a second symmetric key based on the initial key and the second set of seed bits.

In some embodiments, the second symmetric key may be derived at both the first computing device 302A and the second computing device 302B using the same key derivation function (e.g., the first KDF) used to generate the first symmetric key. However, in some embodiments, the second symmetric key may be derived using a second KDF, different from the first KDF. For example, each computing device may store multiple (e.g., two or more) KDFs, and a predefined arrangement may be established defining which KDF is to be used for generating certain symmetric keys. As one example, it may be agreed upon to generally use the first KDF to generate symmetric keys, except that for every fifth symmetric key generated from an initial key, the KDF is rotated such that a different KDF is used. As another example, the use of a KDF may be based on a date or time. For instance, the KDFs may be rotated out every hour, every ten minutes, or the like. In a further example, the first KDF may be used to generate symmetric keys only on Mondays, Wednesdays, and Fridays, the second KDF may be used to generate symmetric keys on Tuesdays and Saturdays, and the third KDF may be used to generate symmetric keys on Thursdays and Sundays.

Regardless of whether or not the KDF is rotated, each of the first computing device 302A and the second computing device 302B may use the same KDF to each derive the second symmetric key using the initial key and the second set of seed bits. By deriving a second symmetric key from the initial key and the second set of seed bits, embodiments herein avoid the need to perform another computationally intensive and burdensome key distribution process (e.g., as described above in connection with FIG. 1), and instead, the computing devices need only receive sufficient seed bits to generate a new symmetric key, allowing for the symmetric key update process to be performed within extremely low bandwidth environments or during intermittent connections. Further, improved security is maintained because the initial key is never exposed (e.g., never used for secure communications). Said differently, a potential bad actor would need not only know the initial key (which is never exposed), but also the specific set of seed bits, as well as the type of KDF used to generate the key.

Following the derivation of the second symmetric key by each of the first and second computing devices, an optional symmetric key confirmation process (e.g., similar to operation 610) may be performed to ensure that both of the computing devices have derived the same second symmetric key. As described above, the symmetric key confirmation process may involve a test message transmission, a comparison of KCVs of the second symmetric keys derived at both the first computing device 302A and the second computing device 302B, and/or the like.

Once the second symmetric key has been derived at both the first computing device 302A and the second computing device 302B (and optionally, after a symmetric key confirmation process has successfully been performed with respect to the second symmetric key), the first and second computing devices may then begin communicating with each other using the second symmetric key. As shown by operation 708, the apparatus 400 includes means, such as processor 402, memory 404, data protection circuitry 412, or the like, for performing a second cryptographic data protection action using the second symmetric key. For instance, the computing devices may continue to encrypt and decrypt transmitted data using the second symmetric key, rather than the first symmetric key. In this regard, use of the first symmetric key may be discontinued. For instance, the first and second computing devices may begin securely communicating using the second symmetric key and zeroize, erase, or otherwise discontinue use of the first symmetric key.

While the operations of FIG. 7 describe receiving a second set of seed bits and deriving a new symmetric key in response to an occurrence of a triggering condition, it is to be appreciated that the occurrence of the triggering condition may not necessarily cause new sets of seed bits to be received, but instead, cause a rotation of symmetric keys which have already been derived. For example, in some embodiments, the first computing device 302A and the second computing device 302B may receive sets of seed bits continuously over time (e.g., from bit generation device 312) and continuously derive and store symmetric keys for future use. Said differently, each computing device may derive and store a plurality of future symmetric keys while the first symmetric key is in use, and upon occurrence of a triggering condition (e.g., expiration of the first symmetric key), the computing devices may select a future key from the stored plurality of future keys and continue to securely communicate using the selected future key.

In this regard, the apparatus 400 includes means, such as processor 402, memory 404, communications hardware 406, or the like, for receiving one or more sets of seed bits. The apparatus 400 also includes means, such as processor 402, memory 404, key derivation circuitry 410, or the like, for deriving one or more future symmetric keys based on the initial key and the one or more sets of seed bits. The apparatus also includes means, such as processor 402, memory 404, key derivation circuitry 410, or the like, for storing the one or more future symmetric keys. In this regard, the future symmetric keys may be stored (e.g., in memory 404 and/or storage device 306A) and queued for future use.

In response to an occurrence of a triggering condition, a symmetric key update process may be performed that includes selecting a future key from the one or more stored future keys. The first symmetric key may then be rotated out for the selected future key, which may then be used for secure communication between the computing devices going forward. In this regard, the apparatus 400 includes means, such as processor 402, memory 404, data protection circuitry 412, or the like, for selecting a future symmetric key from the one or more future symmetric keys. The selected future key may be selected based on a sequential order of the stored future symmetric keys (e.g., the first future key derived may be selected to be used first). In some embodiments, the selected future key may be selected based on a predefined agreement between the first computing device 302A and the second computing device 302B. For instance, the agreement may define an order in which to organize and use the future keys. Once a future key is selected, it may be rotated out with the symmetric key currently in use, and the future key may be used to perform cryptographic data protection actions between the first computing device 302A and second computing device 302B.

The operations of FIG. 7 may be repeated for hundreds, thousands, millions, or even billions of keys. In other words, new symmetric keys may continue to be generated (e.g., before or upon expiration of a previous symmetric key) by using a new set of seed bits and the initial key. In some embodiments, these operations may be repeated a predefined number of times before discontinuing the use of the initial key. In other words, a new initial key may be distributed (e.g., via a key distribution process) after some number of symmetric keys have been derived using the initial key. For example, after one million symmetric keys have been generated using the initial key, the method may start over at operation 602, wherein another initial key is distributed to the computing devices. As described above and using this example, the generation of one million symmetric keys (through receiving one million sets of seed bits) is a vast improvement in resource preservation by otherwise avoiding the need to perform one million key distribution processes.

As described above, example embodiments provide methods and apparatuses that enable secure communication based on random key derivation. Example embodiments thus provide tools that overcome the problems faced in the event of expiration of a symmetric key lifecycle. By avoiding the need to continuously perform key distribution processes that often involve computationally intensive methods and manual tasks including physically secure delivery of keys, example embodiments thus save time and resources, while also eliminating the possibility of human error that has been unavoidable in the past. Moreover, by leveraging a lightweight and easily transmissible set of seed bits to generate new symmetric keys, embodiments described herein enable secure communication between devices to be maintained even in times of intermittent connections or low bandwidth environments.

FIGS. 6 and 7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for secure communication based on random key derivation, the method comprising:
   receiving, by communications hardware of a first device, an initial key shared between the first device and a second device;
   receiving, by the communications hardware of the first device, a first set of seed bits, wherein the first set of seed bits is also received by the second device;
   deriving, by key derivation circuitry of the first device, a first symmetric key based on the initial key and the first set of seed bits; and
   performing, by data protection circuitry of the first device, a first cryptographic data protection action using the first symmetric key,
   wherein the first cryptographic data protection action facilitates secure communication between the first device and the second device based on the second device having also derived the first symmetric key.

2. The method of claim 1, further comprising, in response to occurrence of a triggering condition associated with the first symmetric key, performing a symmetric key update process comprising:
   receiving, by the communications hardware of the first device, a second set of seed bits;
   deriving, by the key derivation circuitry of the first device, a second symmetric key based on the initial key and the second set of seed bits; and
   performing, by the data protection circuitry of the first device, a second cryptographic data protection action using the second symmetric key,
   wherein the second symmetric key facilitates the secure communication between the first device and the second device, the second device having also derived the second symmetric key based on the initial key and the second set of seed bits.

3. The method of claim 2, wherein the triggering condition comprises one of a predefined amount of cryptographic data protection actions having been performed using the first symmetric key, a predefined amount of time having elapsed since the deriving of the first symmetric key, or an update, replacement, or failure of the first device or the second device.

4. The method of claim 2, wherein the key derivation circuitry of the first device derives the first symmetric key using a first key derivation function (KDF).

5. The method of claim 4, wherein the key derivation circuitry of the first device derives the second symmetric key using a second KDF different from the first KDF.

6. The method of claim 1, wherein performing the first cryptographic data protection action comprises at least one of:
 encrypting, by the data protection circuitry of the first device, data using the first symmetric key,
 decrypting, by the data protection circuitry of the first device, encrypted data using the first symmetric key, wherein the encrypted data is received from the second device, the encrypted data having been encrypted using the first symmetric key,
 generating, by the key derivation circuitry of the first device, a cryptographic key based at least on the first symmetric key, and
 generating, by the data protection circuitry of the first device, a message authentication code using the first symmetric key.

7. The method of claim 1, wherein a key generator of the first device establishes the initial key via quantum key distribution (QKD).

8. The method of claim 1, wherein the communications hardware of the first device receives the initial key from a key distribution device at an installed location of the first device.

9. The method of claim 1, wherein the first set of seed bits comprises a random number, and wherein the first set of seed bits is generated using a random number generator.

10. The method of claim 9, wherein the random number generator is a quantum random number generator (QRNG).

11. The method of claim 1, further comprising:
 receiving, by the communications hardware of the first device, one or more sets of seed bits;
 deriving, by the key derivation circuitry of the first device, one or more future symmetric keys based on the initial key and the one or more sets of seed bits;
 storing, by the key derivation circuitry of the first device, the one or more future symmetric keys; and
 in response to occurrence of a triggering condition associated with the first symmetric key, performing a symmetric key update process comprising:
  selecting, by the data protection circuitry of the first device, a future symmetric key from the one or more future symmetric keys; and
  performing, by the data protection circuitry of the first device, a second cryptographic data protection action using the future symmetric key,
 wherein the future symmetric key facilitates the secure communication between the first device and the second device, the second device having also derived the future symmetric key based on the initial key and the one or more sets of seed bits.

12. An apparatus for secure communication based on random key derivation, the apparatus comprising:
 communications hardware of a first device configured to:
  receive an initial key shared between the first device and a second device, and
  receive a first set of seed bits, wherein the first set of seed bits is also received by the second device;
 key derivation circuitry of the first device configured to derive a first symmetric key based on the initial key and the first set of seed bits; and
 data protection circuitry of the first device configured to perform a first cryptographic data protection action using the first symmetric key,
 wherein the first cryptographic data protection action facilitates secure communication between the first device and the second device based on the second device having also derived the first symmetric key.

13. The apparatus of claim 12, wherein the communications hardware is further configured to, in response to occurrence of a triggering condition associated with the first symmetric key, receive a second set of seed bits;
 wherein the key derivation circuitry is further configured to derive a second symmetric key based on the initial key and the second set of seed bits;
 wherein the data protection circuitry is further configured to perform a second cryptographic data protection action using the second symmetric key, and
 wherein the second symmetric key facilitates the secure communication between the first device and the second device, the second device having also derived the second symmetric key based on the initial key and the second set of seed bits.

14. The apparatus of claim 13, wherein the triggering condition comprises one of a predefined amount of cryptographic data protection actions having been performed using the first symmetric key, a predefined amount of time having elapsed since the deriving of the first symmetric key, or an update, replacement, or failure of the first device or the second device.

15. The apparatus of claim 13, wherein the key derivation circuitry is configured to derive the first symmetric key using a first key derivation function (KDF).

16. The apparatus of claim 15, wherein the key derivation circuitry is configured to derive the second symmetric key using a second KDF different from the first KDF.

17. The apparatus of claim 12, wherein the data protection circuitry performs the first cryptographic data protection action by:
 encrypting data using the first symmetric key,
 decrypting encrypted data using the first symmetric key, wherein the encrypted data is received from the second device, the encrypted data having been encrypted using the first symmetric key,
 generating a cryptographic key based at least on the first symmetric key, and
 generating a message authentication code using the first symmetric key.

18. The apparatus of claim 12, further comprising a key generator configured to establish the initial key via quantum key distribution (QKD).

19. The apparatus of claim 12, wherein the communications hardware of the first device is configured to receive the initial key from a key loading device at an installed location of the first device.

20. The apparatus of claim 12, wherein the first set of seed bits comprises a random number, and wherein the first set of seed bits is received from a random number generator.

21. The apparatus of claim 20, wherein the random number generator is a quantum random number generator (QRNG).

22. The apparatus of claim 12, wherein the communications hardware is further configured to receive one or more sets of seed bits;
 wherein the key derivation circuitry is further configured to:
  derive one or more future symmetric keys based on the initial key and the one or more sets of seed bits, and
  store the one or more future symmetric keys; and
 wherein the data protection circuitry is further configured to, in response to occurrence of a triggering condition associated with the first symmetric key, perform a symmetric key update process comprising:
  selecting a future symmetric key from the one or more future symmetric keys; and performing a second cryptographic data protection action using the future symmetric key, wherein the future symmetric key facilitates the secure communication between the first device and the second device, the second device having also derived the future symmetric key based on the initial key and the one or more sets of seed bits.

23. A computer program product for secure communication based on random key derivation, the computer program product comprising at least one non-transitory computer-readable storage medium storing software instructions that, when executed, cause a first device to:

receive an initial key shared between the first device and a second device;

receive a first set of seed bits, wherein the first set of seed bits is also received by the second device;

derive a first symmetric key based on the initial key and the first set of seed bits; and perform a first cryptographic data protection action using the first symmetric key, wherein the first cryptographic data protection action facilitates secure communication between the first device and the second device based on the second device having also derived the first symmetric key.

* * * * *